US008604708B2

(12) United States Patent
Liaw

(10) Patent No.: US 8,604,708 B2
(45) Date of Patent: Dec. 10, 2013

(54) VOLTAGE-CONTROLLED LIGHT DIFFUSING MODULE, FLASH LAMP MODULE AND CONTROLLING METHOD THEREOF BASED ON FACE INFORMATION

(75) Inventor: Ming-Jiun Liaw, Miaoli County (TW)

(73) Assignee: Altek Corporation, Hsinchu (TW)

( * ) Notice: Subject to any disclaimer, the term of this patent is extended or adjusted under 35 U.S.C. 154(b) by 160 days.

(21) Appl. No.: 13/372,491

(22) Filed: Feb. 13, 2012

(65) Prior Publication Data

US 2013/0154514 A1 Jun. 20, 2013

(30) Foreign Application Priority Data

Dec. 16, 2011 (TW) ............................ 100146915 A

(51) Int. Cl.
*H05B 37/00* (2006.01)
*H05B 39/00* (2006.01)
*H05B 41/14* (2006.01)

(52) U.S. Cl.
USPC .................... 315/241 P; 315/241 S; 315/291; 315/307

(58) Field of Classification Search
None
See application file for complete search history.

(56) References Cited

U.S. PATENT DOCUMENTS 5,023,639 A * 6/1991 Ushiro et al. .................. 396/61

* cited by examiner

*Primary Examiner* — Anh Tran
(74) *Attorney, Agent, or Firm* — Jianq Chyun IP Office

(57) ABSTRACT

A voltage-controlled light diffusing module, a flash lamp module and a controlling method thereof are provided. The voltage-controlled light diffusing module includes a light diffuser, a driving circuit and an information processing unit. The information processing unit receives face information for deciding a driving voltage of the driving circuit, so as to change transmission of the light diffuser.

16 Claims, 8 Drawing Sheets

VOLTAGE-CONTROLLED LIGHT DIFFUSING MODULE, FLASH LAMP MODULE AND CONTROLLING METHOD THEREOF BASED ON FACE INFORMATION

CROSS-REFERENCE TO RELATED APPLICATION

This application claims the priority benefit of Taiwan application serial no. 100146915, filed on Dec. 16, 2011. The entirety of the above-mentioned patent application is hereby incorporated by reference herein and made a part of this specification.

BACKGROUND OF THE INVENTION

1. Field of the Invention

The present invention relates to a photography equipment. Specifically, the present invention relates to a voltage-controlled light diffusing module, a flash lamp module and a controlling method thereof.

2. Description of Related Art

Generally, digital cameras or film cameras are integrated with flash lamps to allow users to compensate light conveniently under situations like dim light or back light. In addition to the integrated flash light, some cameras are equipped with hot shoe or flash lamp socket for connecting to additional flash lamps.

Because the flash lamp is normally much stronger than the environment light source, when the light of flash lamp is applied to an object directly, shadows will be created behind the object. In addition, the rim of the object might be too stiff. Moreover, undesirable reflected-light might be created on the face. Therefore, users will manually dispose a light diffuser in front of the flash lamp to allow the light of the flash lamp to be projected more evenly on the object.

However, users usually need to manually dispose and remove the light diffuser, which is inconvenient.

SUMMARY OF THE INVENTION

The present invention provides a voltage-controlled light diffusing module, capable of determining appropriate driving voltage based on the face information so as to adjust the light transmission of the light diffuser. The drawback of manually disposing the diffusing board in the prior art may be amended.

The present invention provides a voltage-controlled light diffusing module, including a light diffuser, a driving circuit and a information processing unit. The information processing unit receives a face information, and accordingly estimates the distance between the face and the diffuser. The driving voltage of the driving circuit of the light diffuser is decided to change the transmission of the light diffuser.

The light diffuser is implemented by the polymer-dispersed liquid crystal display (PDLC Display), the popular liquid crystal display (LCD), or the LCD with polymer-dispersed liquid crystal display droplet (PDLC Droplet).

The aforementioned face information may at least be used by the information processing unit to estimate the information of the distance between the face and the light diffuser, including the size of the face, the coordinate of the face position, the distance between the face and the light diffuser, or the combination of part of all of such information. In addition, the aforementioned face information includes at least a signal for determining whether a face is detected. For example, 0 represents that no face is detected and 1 represents that a face is detected. In another example, if the size of the face is 0, then no face is detected. In yet another example, if the distance between the face and the light diffuser is larger than a threshold value (for example, one kilometer), then no face is detected.

In another embodiment of the present invention, the information processing unit further receives a zoom information. The information processing unit estimate the distance between the face and the light diffuser based on the zoom information and the face information.

In another embodiment of the present invention, the aforementioned voltage-controlled light diffusing module further includes a face detection unit. The output end of the face detection unit is coupled to the information processing unit and the input end is used to receive at least one image. A face is detected from the image and the face information is outputted to the information processing unit.

The aforementioned data processing unit and the face detection unit are physical chips or application procedures.

In another embodiment of the present invention, the aforementioned light diffuser further includes a plurality of sub-blocks. The change of light after the light source passes each of the sub-blocks is adjusted by applying different driving voltages. Moreover, the information processing unit decides the driving voltage of each sub-block based on the face information respectively. Furthermore, among the sub-blocks, the sub-blocks that correspond to the face information and the sub-blocks that do not correspond to the face information are respectively driven by different driving voltages. In addition, among the sub-blocks, when the face information shows that there are multiple faces, the driving voltages of the sub-blocks corresponding to the faces may be consistent or inconsistent. As a result, the light on one or multiple faces can be compensated differently from other objects being photographed and thus achieves better image quality.

The present invention further provides a flash lamp module, which includes a light source, a reflection unit, a flash driving circuit and a voltage-controlled light diffusing module based on the face information. The reflection unit is used to reflect the light energy of the light source. The flash driving circuit is coupled to the light source and receives a triggering signal for controlling time or magnitude of light energy output of the light source. The voltage-controlled light diffusing module based on the face information is disposed in front of the light source of the flash lamp module. That is, the voltage-controlled light diffusing module is configured in a direction, wherein light of the light source and reflected light of the reflection unit go forward to the direction. The voltage-controlled light diffusing module adjusts scattering energy or transmission energy of the light passing the voltage-controlled light diffusing module based on the face information. The voltage-controlled light diffusing module is the aforementioned voltage-controlled light diffusing module of the present invention, and is disposed on the route of the light outputted by the light source. The voltage-controlled light diffusing module determines the driving voltage of the light diffuser on the voltage-controlled light diffusing module based on the face information, and accordingly change the energy of the light source passing the light diffuser.

The present invention provides a flash lamp control method, adapted for the flash lamp module of the present invention. The flash lamp control method includes to receive face information; to determine the driving voltage of the light diffuser based on the face information; and to trigger the light source to perform the flash procedure.

Based on the above, in the present invention, the voltage-controlled light diffusing module, the flash control circuit and the flash lamp control method may change the light transmission of the light diffuser based on the face information, without the necessity of manual adjustment by an user.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

First Embodiment

Figure 1:
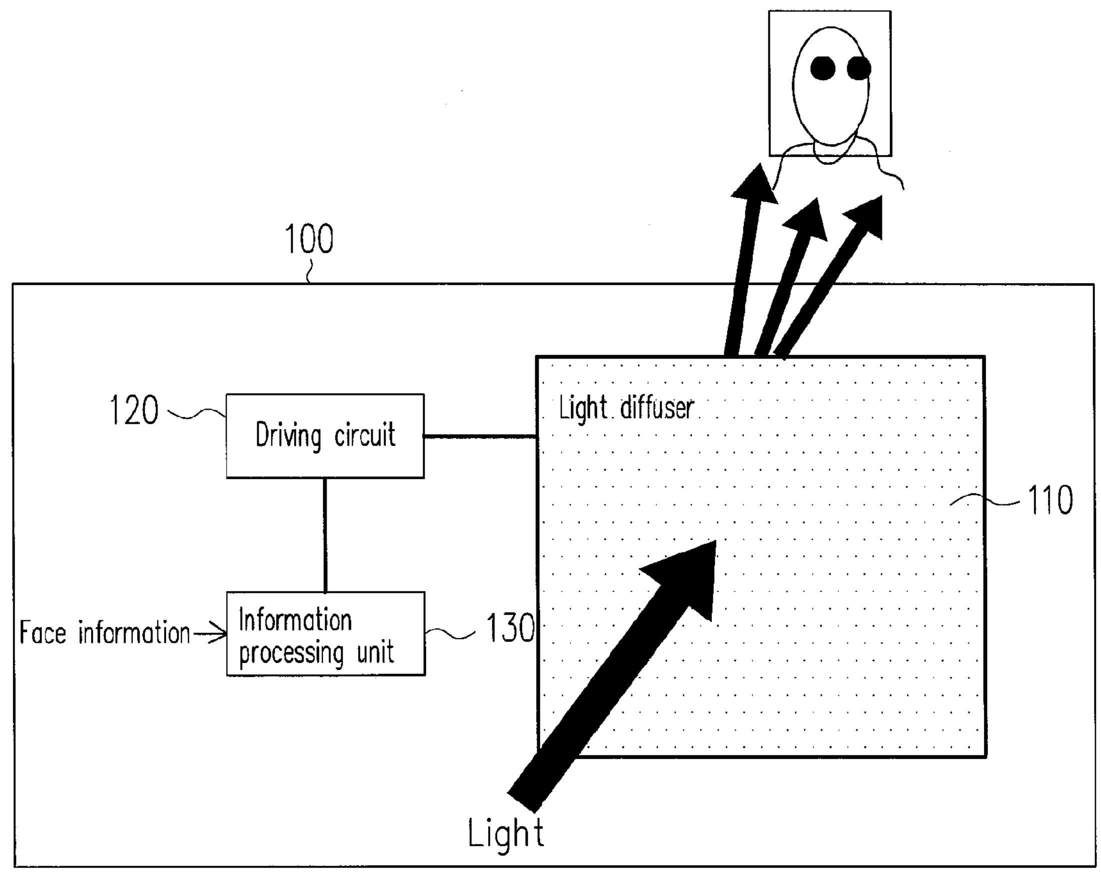
FIG. 1 is a block diagram of a voltage-controlled light diffusing module based on the face information according to the first embodiment of the present invention.

FIG. 1 is a block diagram of a voltage-controlled light diffusing module based on the face information according to the first embodiment of the present invention. Referring to FIG. 1, the voltage-controlled light diffusing module 100 includes a light diffuser 110, a driving circuit 120 and an information processing unit 130. The light transmission energy of the light diffuser 110 may be controlled by changing its driving voltage. The driving circuit 120 is coupled to the light diffuser 110 to provide the driving voltage necessary for the light diffuser 110. The information processing unit 130 is coupled to the driving circuit 120. The information processing unit 130 may be a physical chip or an application procedure in a physical chip. The information processing unit 130 is used to receive the face information and accordingly decide the driving voltage of the driving circuit 120, so as to change the energy of the light passing the light diffuser 110.

The face information may at least be used by the information processing unit to estimate the information of the distance between the face and the light diffuser, including the size of the face, the coordinate of the face position, the distance between the face and the light diffuser, or the combination of part of all of such information. In addition, the aforementioned face information includes at least a signal for determining whether a face is detected. For example, 0 represents that no face is detected and 1 represents that a face is detected. In another example, if the size of the face is 0, then no face is detected. In yet another example, if the distance between the face and the light diffuser is larger than a threshold value (for example, one kilometer), then no face is detected.

Figure 2:
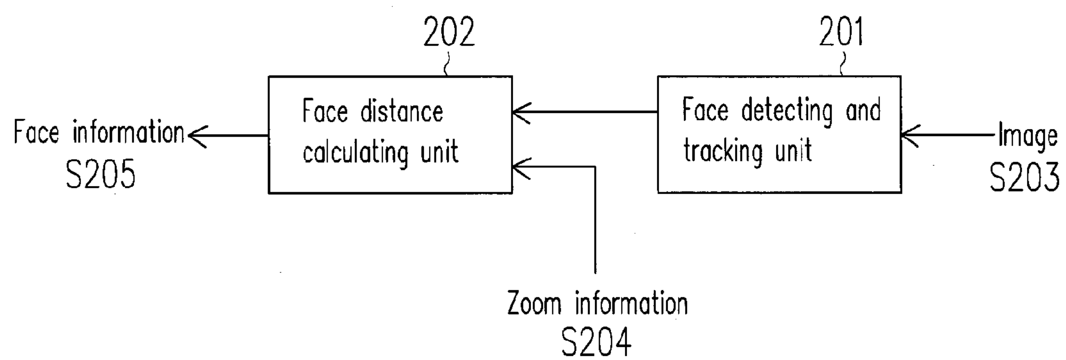
FIG. 2 is a schematic diagram illustrating the generation of the face information.

On image capture systems without optical zoom or digital zoom, the size of the face can be used directly to determine the distance between the face and the light diffuser. On image capture systems with either or both of optical zoom or digital zoom, the method for generating the face information is shown in FIG. 2. After the face detecting and tracking unit 201 receives an image 203, the position and size of the face is found and outputted to the face distance calculating unit 202. The face distance calculating unit 202 further receives zoom information (including optical zoom or digital zoom or both) S204 to calculate or search a table to obtain the distance between the face and light diffuser. In addition, output the face information considering the signal representation of whether a face is detected or not. For example, first transmit the information of whether a face is detected then transmit the face distance information, or combine and transmit the two signals together. For example, the distance being equal to indefinite or larger than or equal to a predetermined distance is used to indicate that no face is detected.

Figure 3A:
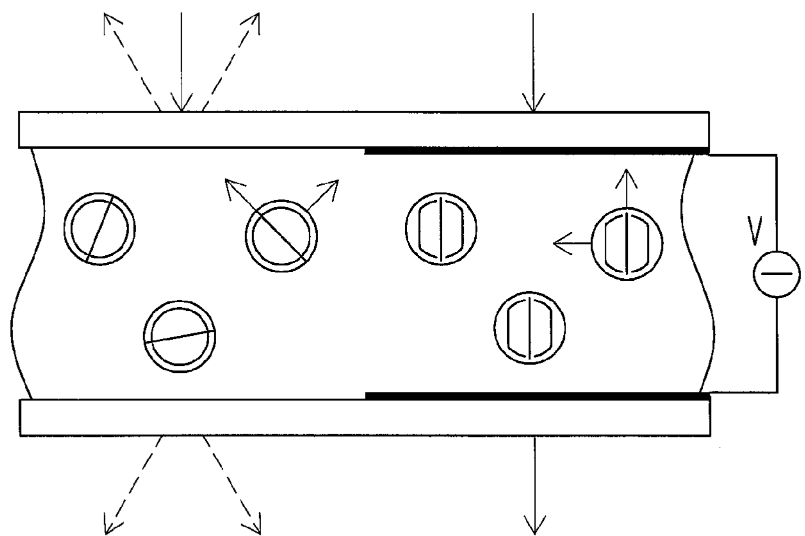
FIG. 3A is a schematic view of a light-passing character of the PDLC according to the first embodiment of the present invention.
Figure 3B:
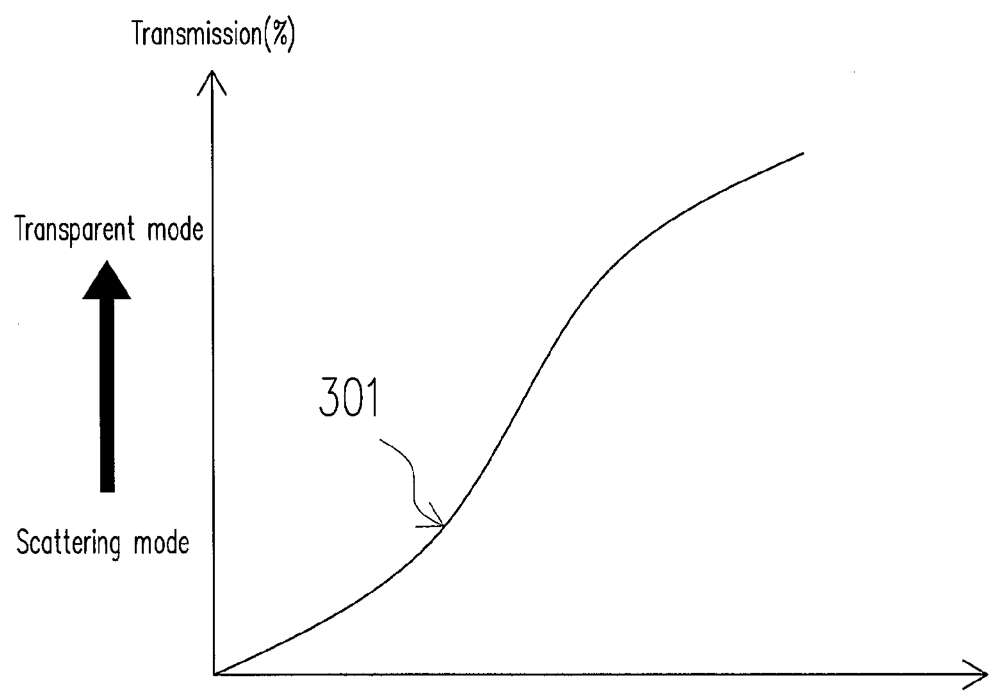
FIG. 3B is a curve diagram of a photoelectric character of the PDLC according to the first embodiment of the present invention.

In an embodiment of the present invention, the light diffuser 110 may be a polymer-dispersed liquid crystal display (PDLC Display), a liquid crystal display (LCD) or a LCD with polymer-dispersed liquid crystal droplet (PDLC Droplet). In this embodiment, the light diffuser 110 is, for example, a Polymer-dispersed liquid crystal (PDLC). FIG. 3A is a schematic view of a light-passing character of the PDLC according to the first embodiment of the present invention. FIG. 3B is a curve diagram of a photoelectric character of the PDLC according to the first embodiment of the present invention. PDLC is an agglutination state of the combination of the liquid crystal and the polymer. When no voltage is applied, the direction of the LC director in the liquid crystal droplet is dispersed randomly in the polymer. The lights will be scattered to present a non-transparent state. At this time, the PDLC is performing the scattering mode. When a voltage high enough is applied, the direction of the LC director in the liquid crystal droplet will align with the direction of the electron so that the light can pass. At this time, the PDLC is performing the transparent mode. When the applied voltage is changed, the scattering and transmission of the PDLC when light passes can be changed. The higher the voltage, the less the scattering light and the more the transmission energy. On the contrary, the lower the voltage, the more the scattering light and the less the transmission energy. The photoelectric character of the PDLC can be demonstrated by the curve 301 in FIG. 3B.

Figure 4:
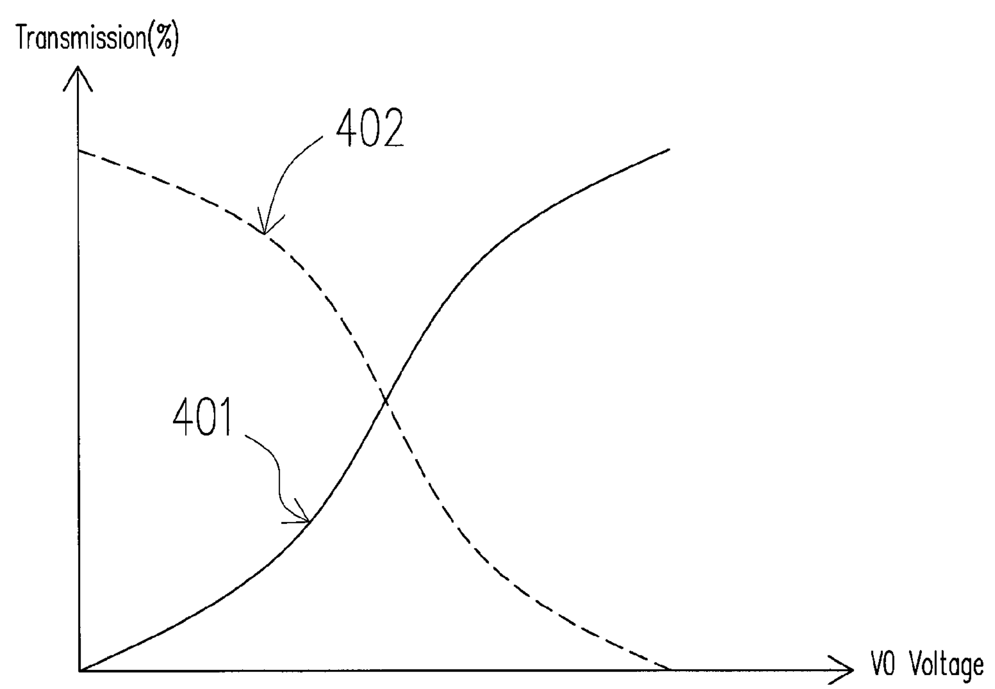
FIG. 4 is curve diagram of a photoelectric character of another LCD according to the first embodiment of the present invention.

In addition, in other embodiments, the light diffuser 110 can be implemented by the techniques of twisted nematic (TN), super-twisted nematic (STN), in-plane switching (IPS), vertical alignment (VA), multi-domain vertical alignment (MVA), fringe field switching (FFS) . . . etc. Although the aforementioned techniques cannot scatter lights, they can be used on the light diffuser 110 because the transmission can be adjusted by the voltage. FIG. 4 is curve diagram of a photoelectric character of another LCD according to the first embodiment of the present invention. The normally white (NW) LCD and the normally black (NB) LCD are used as examples in FIG. 4. The transmission of the normally white LCD is higher when the voltage is lower, as shown by curve 402. The transmission of the normally white LCD is lower when the voltage is lower, as shown by curve 401. Because the PDLC has the light scattering function, the following embodiments use the PDLC as explanations.

Referring back to FIG. 1, to let the flash lamp compensate light suitably and avoid over-exposure, the information processing unit 130 determines the driving voltage of the driving circuit 120 according to the face information received. Such driving voltage is applied to the light diffuser 110 to adjust the transmission energy of the light.

When the face information that the information processing unit 130 receives indicates that no face is detected, the information processing unit 130 sets the driving voltage as a preset voltage to enable the light diffuser 110 to work under a high transmission mode. When the face information received by the information processing unit 130 indicates that a face is detected, the information processing unit 130 will search the principles listed in a table to determine the driving voltage based on the size of the face or the distance of the face in the face information. The Table 1 below shows the correlation between the driving voltage and the distance of the face.

As shown by Table 1, the closer the face is to the image capturing system, the smaller the transmission energy of the light should be. (That is, for PDLC, the scattering magnitude should be bigger.) Therefore, the driving voltage applied to the normally black LCD and the PDLC should be low, and the driving voltage applied to the normally white LCD should be high.

On the contrary, the farther the face is from the image capturing system, the bigger the transmission energy of the light should be. (That is, for PDLC, the scattering magnitude should be smaller.) Accordingly, as shown in Table 1, the driving voltage applied to the normally black LCD and the PDLC should be high, and the driving voltage applied to the normally white LCD should be low. In Table 1, the correlation between the distance of the face and the driving voltage can be decided by experiment, and pre-stored in the memory unit readable by the information processing unit 130 by a using a format or a parallel table.

TABLE 1

| | |
|---|---|
| Information of distance of face | Close ⇒ Far |
| Transmission of light diffuser | Small ⇒ Large |
| Light passing state | Scattering mode ⇒ transparent mode<br>Low transmission ⇒ High Transmission |
| Driving voltage of normally black LCD | Small ⇒ Large |
| Driving voltage of normally white LCD | Large ⇒ Small |

Figure 5B:
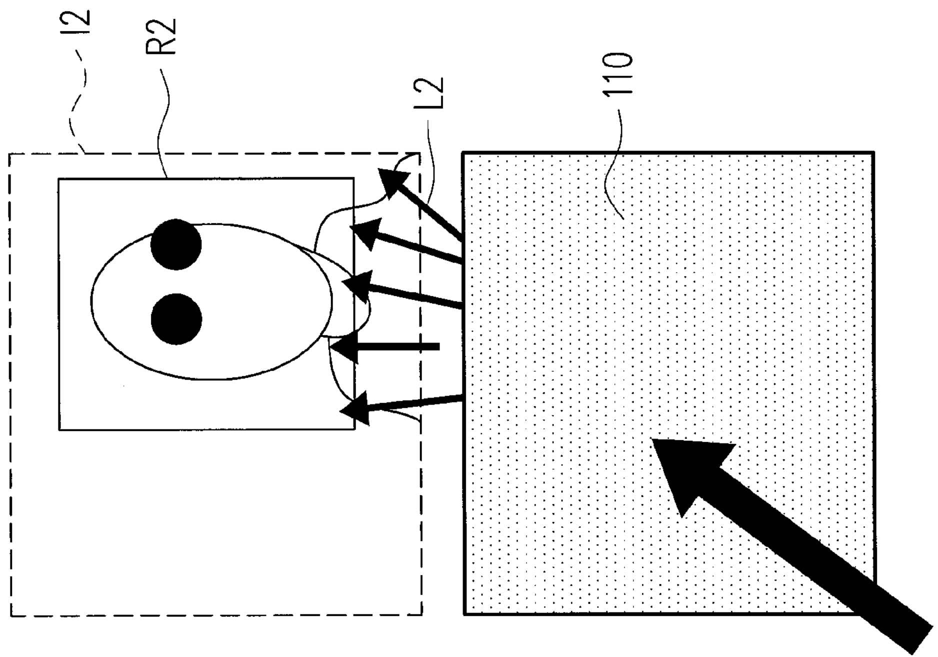
FIGS. 5A and 5B are schematic operational views of the light diffusing module of FIG. 1.
Figure 5A:
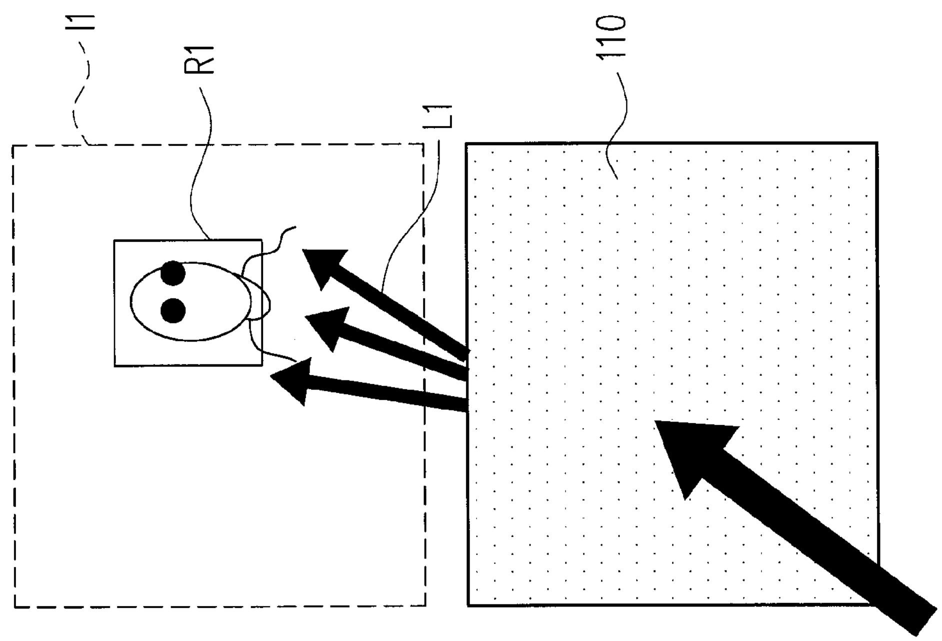

FIGS. 5A and 5B are schematic operational views of the light diffusing module of FIG. 1. Referring to FIGS. 1, 2, 5A and 5B in combination, the entire plate of the light diffuser 110 is applied with a same voltage. Referring to FIG. 5A, after the image processing unit obtains image I1, the face region R1 of the image I1 is detected by the face detecting and tracking unit 201, and the size of the face is calculated. In FIG. 5A, when the size of the face is smaller, the face is farer from the image capturing system. Therefore, the information processing unit 130 decides to use higher driving voltage to drive the light diffuser 110 to allow more light to directly pass to compensate light.

Referring to FIG. 5B, after the image processing unit obtains image 12, the face region R2 of the image 12 is detected by the face detecting and tracking unit 201, and the size of the face is calculated. In FIG. 5B, when the size of the face is larger, the face is closer to the image capturing system. Therefore, the information processing unit 130 decides to use lower driving voltage to drive the light diffuser 110 to allow less light to pass to compensate light. In other words, the light L1 passing the light diffuser 130 is stronger than the light L2. Therefore, the light of the objects in the images I1 and I2 can be properly compensated, so as to lower the chance of over-exposing the objects.

Second Embodiment

Figure 6:
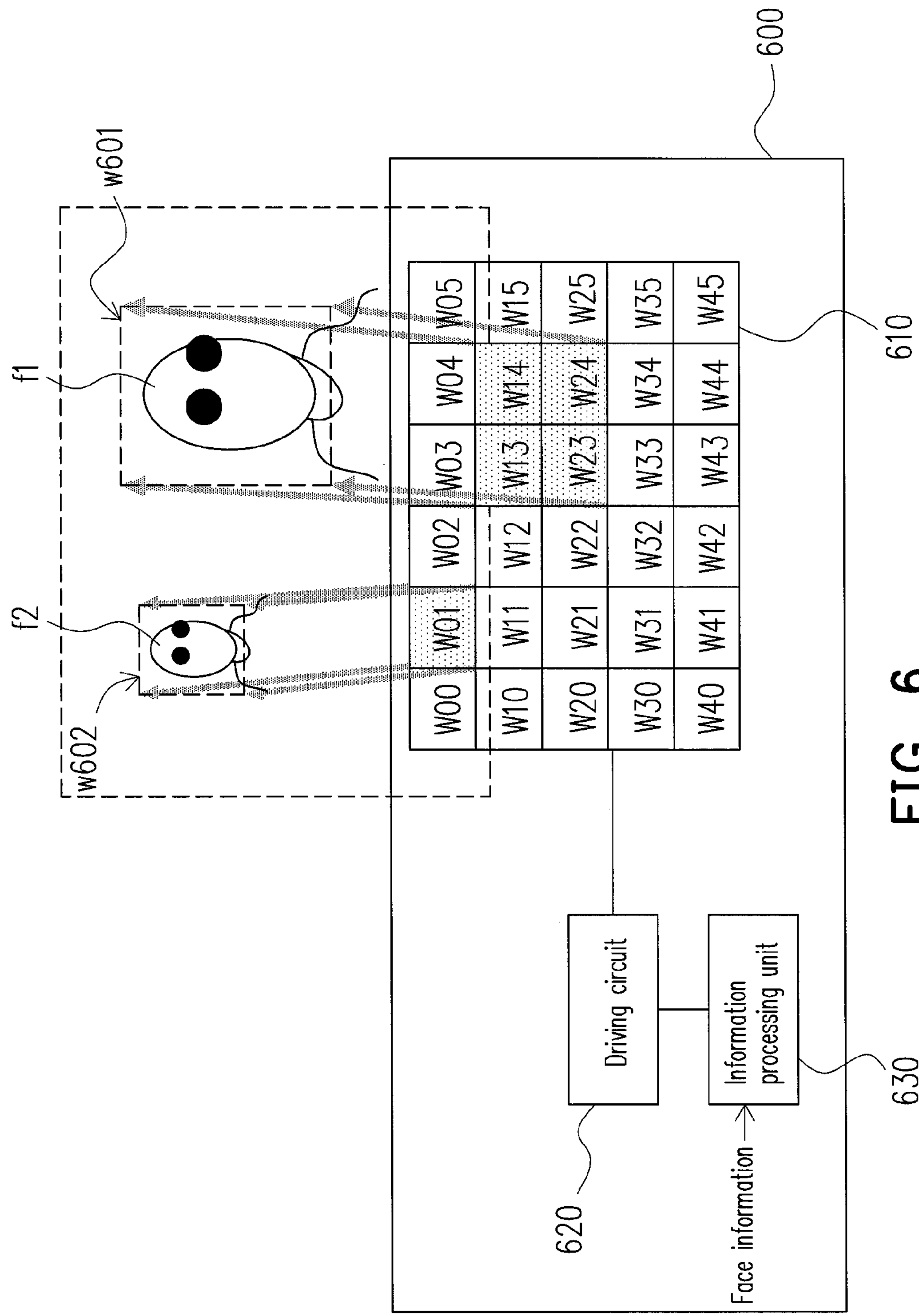
FIG. 6 is a block diagram of a voltage-controlled light diffusing module based on the face information according to the second embodiment of the present invention.

FIG. 6 is a block diagram of a voltage-controlled light diffusing module based on the face information according to the second embodiment of the present invention. Referring to FIG. 6, the voltage-controlled light diffusing module 600 includes a light diffuser 610, a driving circuit 620 and an information processing unit 630. The information processing unit 630 receives the face information to determine the driving voltage of the driving circuit 620, so as to change the energy of the light passing the light diffuser 610.

Referring to FIG. 6, the light diffuser 610 includes multiple (at least two) sub-blocks. Here, 6*6=36 sub-blocks are used as an example. The driving voltage of each sub-block may be controlled independently so different sub-blocks may have different light transmission. In this embodiment, in addition to the size of the face and the distance of the face, the face information further includes the position of the face. Whether the face is detected can be determined by the aforementioned information of the size of the face and the distance of the face. In addition, the distance between the detected face and the image capturing system can also be determined accordingly. Furthermore, the information of the position of the face corresponding to the position of each sub-block can be determined based on the aforementioned information of the position of the face.

The information processing unit 630 determines the corresponding driving voltage for each sub-block based on the face information. As shown in FIG. 6, for example, the image ranges in the object space to be captured by the image capturing system are image region w601 and image region w602.

For image region w601, the light outputted from a flash light source passes the sub-blocks W13, W14, W23 and W24, and projects to the image region w601 in the object space. As a result, light can be compensated on the face f1. The light energy passing the four sub-blocks W13, W14, W23 and W24 is mostly less than the light energy passing the sub-blocks not corresponding to a face. For image region w602, the light outputted from the flash light source passes the sub-block W01, and projects to the image region w602 in the object space. As a result, light can be compensated on the face f2. The light energy passing the sub-block W01 is mostly less than the light energy passing the sub-blocks not corresponding to a face. In addition, because the size of the face f2 is smaller that the face f1, the face f2 is farer from the light diffuser 610. Therefore, the light magnitude passing the sub-block W01 is stronger than the light magnitude passing the sub-blocks W13, W14, W23 and W24. As a result, light can be compensated respectively on the face f1 and the face f2, and no unpleasant reflection light will be created.

Although the aforementioned embodiments of the present invention describe situation in which the face needs to be compensated with softer (i.e. lower light energy) light, some other objects may need to be compensated with softer light. For example, clothes with highly reflective paillettes need to be compensated with light softer than the face. The main feature of the aforementioned embodiment is to provide different energy of the flash lamp to compensate light on faces. The determination of using a stronger energy or a weaker energy depends on the actual photographing situation, and is not limited herein.

The Third Embodiment

Figure 7:
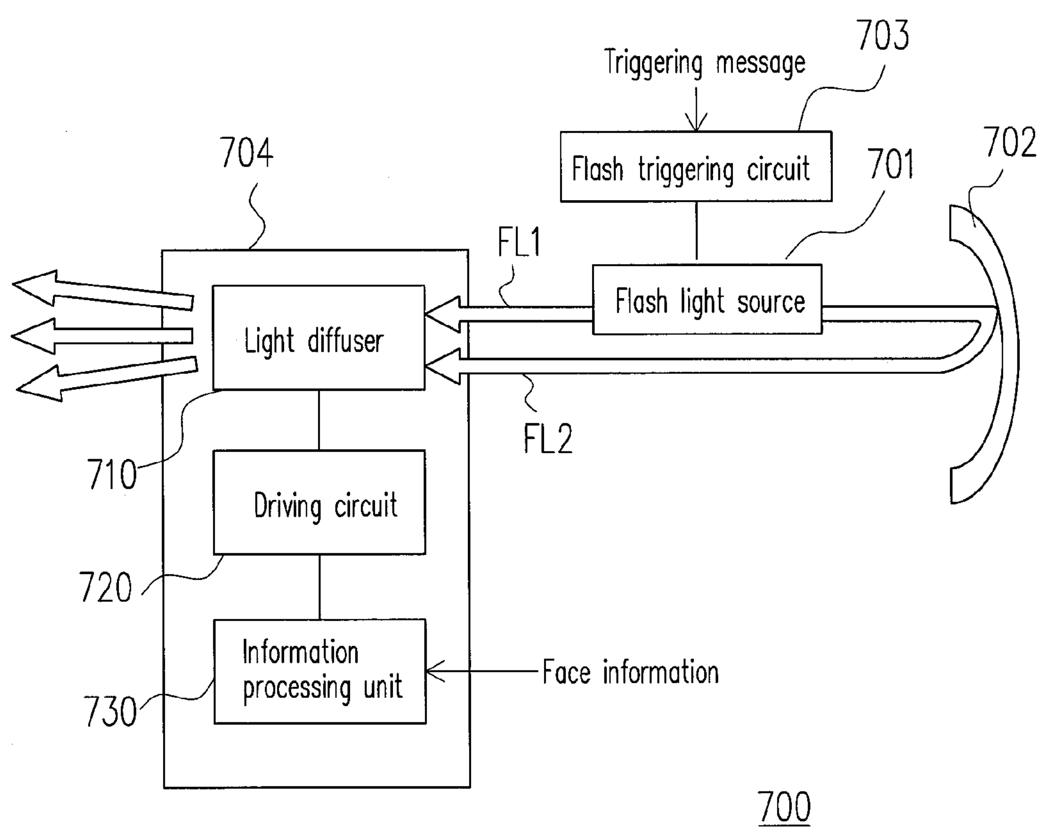
FIG. 7 is a schematic diagram of a flash control circuit of the third embodiment of the present invention.

FIG. 7 is a schematic diagram of a flash control circuit of the third embodiment of the present invention. Referring to FIG. 7, the flash control circuit 700 includes a flash light source 701, a reflection unit 702, a flash triggering circuit 703, and a voltage-controlled light diffusing module 704. The voltage-controlled light diffusing module 704 is disposed in front of the flash light source 701. That is, the voltage-controlled light diffusing module 704 is disposed on the route of the light outputted by the flash light source 701 (for example, the route of the forward-moving light and the reflection light.) In this embodiment, the voltage-controlled light diffusing module 704 includes a light diffuser 710, a driving circuit 720 and an information processing unit 730. The elements of the voltage-controlled light diffusing module 704 in this embodiment is functionally identical or similar to the voltage-controlled light diffusing module 100 in the first embodiment and the voltage-controlled light diffusing module 600 in the second embodiment, and thus will not be discussed in detail.

The flash triggering circuit 703 is coupled to the flash light source 701 to control the light of the flash light source 701. For example, the flash light source 701 is triggered to emit light (i.e. flashlight) by receiving a triggering signal.

The flash light source 701 is used to output the light. Here, a portion of the light (the forward-moving light FL1) directly propagates to the light diffuser 710, and another portion of the light (the reflection light) propagates to the light diffuser 710 after being reflected by the reflection unit 702. The energy of the forward-moving light FL1 and the reflection light FL2 will be adjusted by the light diffuser 710. The method for adjusting the light is described in the aforementioned first embodiment and second embodiment, and therefore will not be repeated.

Figure 8:
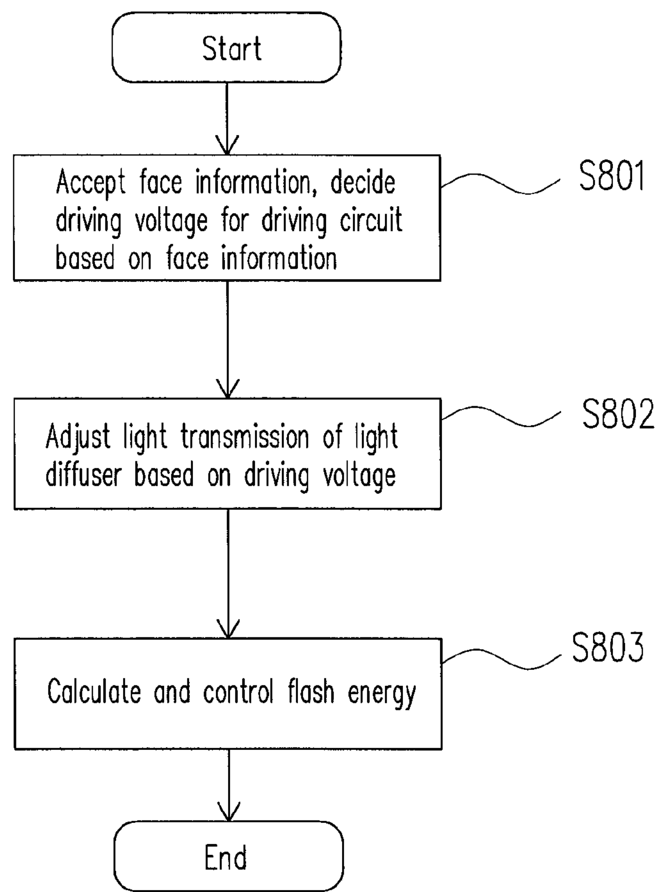
FIG. 8 is a flowchart illustrating a flash lamp control method according to the third embodiment of the present invention.

FIG. 8 is a flowchart illustrating a flash lamp control method according to the third embodiment of the present invention. This embodiment is a method executed by the firmware of the flash control circuit 700 in FIG. 7.

Referring to FIGS. 7 and 8 in combination, in step S801, a face information is received to determine the driving voltage of the driving circuit 702 based on the face information. In step S802, the light transmission of the light diffuser 710 is adjusted based on the driving voltage. In step S803, calculate and control the flash energy. In other words, the firmware determines the driving voltage necessary for the light diffuser 710 based on the face information, and applies the driving voltage to the light diffuser 710. Last, the firmware performs the flash procedure.

Figure 9:
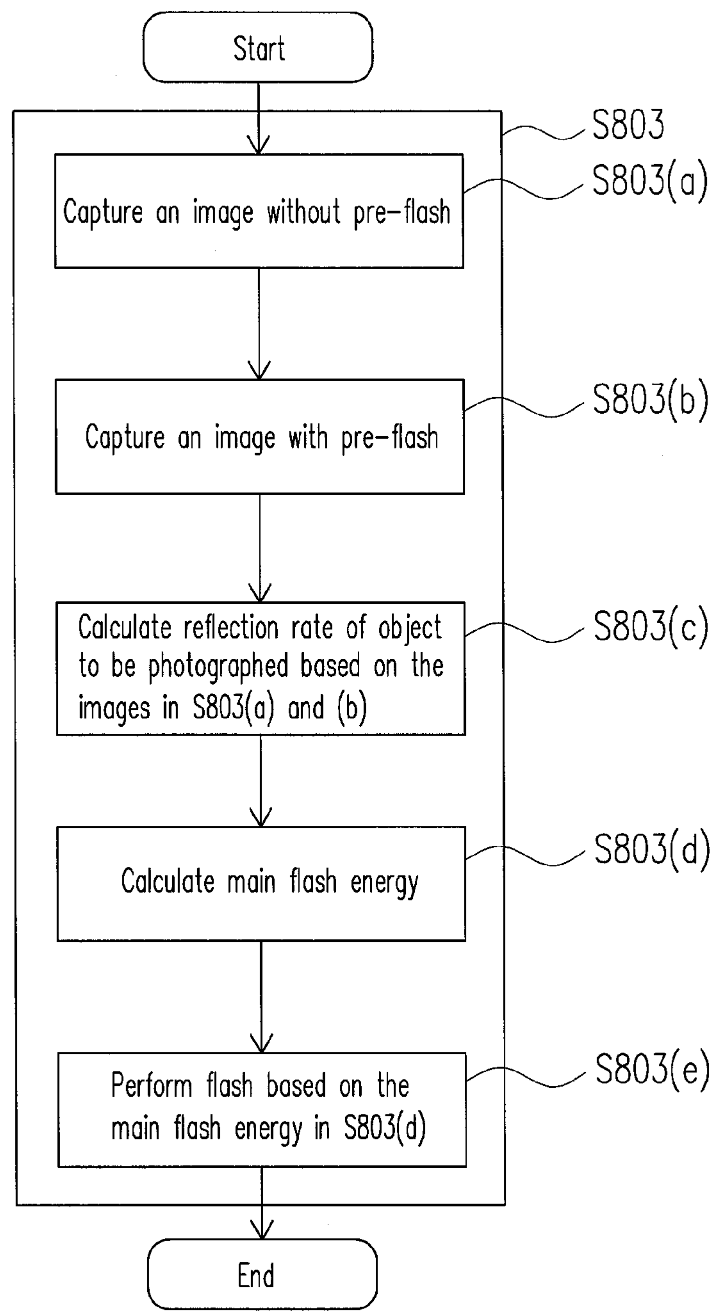
FIG. 9 is a detailed flowchart of step S803 of FIG. 8.

FIG. 9 is a detailed flowchart of step S803 of FIG. 8. Referring to FIG. 9, in step S803(*a*), capture an image that is not pre-flashed. In addition, in step S803(*b*), capture an image that is pre-flashed. In step S803(*c*), calculate the reflection rate of the photographed object based on the two images above. In step S803(*d*), the energy of the main flash is determined based on the aforementioned reflection rate. In step S803(*e*), perform flash according to the main flash energy determined above.

When the main flash energy is propagated, the light diffuser 710 has been applied with proper driving voltage according to the face information before the flash is performed. Therefore, when the main flash energy passes the light diffuser 710, the light will be adjusted so softer scattering light will compensate light on the face, so as to improve the quality of the image taken.

In sum, the aforementioned embodiment may change the light transmission of the light diffuser according to the face detection information so no manual adjustment is necessary for users and thus convenience can be achieved. In addition, the light transmission of each sub-block of the plurality of sub-blocks of the light diffuser can be changed based on the position of the face, so as to compensate light to the face or other objects to improve image quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A voltage-controlled light diffusing module, comprising:
- a light diffuser, adjusting scattering energy or transmission energy of light passing the light diffuser by changing a driving voltage of the light diffuser;
- a driving circuit for the light diffuser, coupled to the light diffuser, providing the driving voltage for the light diffuser; and
- an information processing unit, coupled to the driving circuit for the light diffuser, receiving at least one face information and deciding the driving voltage of the driving circuit for the light diffuser based on the face information.

2. The voltage-controlled light diffusing module according to claim 1, wherein the light diffuser is a polymer-dispersed liquid crystal (PDLC) display unit or a liquid crystal display (LCD) unit with polymer-dispersed liquid crystal droplet.

3. The voltage-controlled light diffusing module according to claim 1, wherein the light diffuser is a LCD unit.

4. The voltage-controlled light diffusing module according to claim 1 further comprises a face detection unit, coupled to the information processing unit, providing the face information for the information processing unit.

5. The voltage-controlled light diffusing module according to claim 1, wherein the face information includes an information for at least determining whether a face is detected.

6. The voltage-controlled light diffusing module according to claim 1, wherein the face information includes an information for at least determining a distance between the light diffuser and a face.

7. A voltage-controlled light diffusing module, comprising:
- a light diffuser, comprising a plurality of sub-blocks, the light diffuser respectively adjusts scattering energy or transmission energy of light passing the sub-blocks by applying different driving voltages;
- a driving circuit for the light diffuser, coupled to the light diffuser, respectively providing the driving voltage for the each of the sub-blocks of the light diffuser; and
- an information processing unit, coupled to the driving circuit for the light diffuser, receiving a message with a face information and respectively determining the driving voltage for each of the sub-blocks of the light diffuser according to the face information.

8. The voltage-controlled light diffusing module according to claim 7, wherein among the sub-blocks of the light diffuser, corresponding sub-blocks relevant to the face information and other sub-blocks irrelevant to the face information are driven by different driving voltages.

9. The voltage-controlled light diffusing module according to claim 7, wherein among the sub-blocks of the light diffuser, when the face information displays a plurality of faces, the driving voltages of a plurality of sub-blocks corresponding to the plurality of faces may be consistent or inconsistent.

10. The voltage-controlled light diffusing module according to claim 7 further comprises a face detection unit, coupled to the information processing unit, providing the face information for the information processing unit.

11. The voltage-controlled light diffusing module according to claim 10, wherein the face detection unit further receives a zoom information and accordingly, in combination with a face size in the face information, provides a face distance information to the data processing unit to determine the driving voltage for each of the sub-blocks of the light diffuser.

12. A flash lamp module, comprising:

a light source;

a reflection unit, reflecting light energy of the light source;

a flash driving circuit, coupled to the light source, receiving triggering signal for controlling time or magnitude of light energy output of the light source; and a voltage-controlled light diffusing module based on the face information, configured in front of the light source of the flash lamp module, that is, the voltage-controlled light diffusing module is configured in a direction, wherein light of the light source and reflected light of the reflection unit go forward to the direction, and the voltage-controlled light diffusing module adjusts scattering energy or transmission energy of the light passing the voltage-controlled light diffusing module based on a face information.

13. The flash lamp module according to claim 12, wherein the voltage-controlled light diffusing module based on the face information comprises:

a light diffuser, adjusting scattering energy or transmission energy of the light passing the light diffuser by changing a driving voltage of the light diffuser;

a driving circuit for the light diffuser, coupled to the light diffuser, providing the driving voltage for the light diffuser; and an information processing unit, coupled to the driving circuit for the light diffuser, receiving at least the face information and deciding the driving voltage of the driving circuit for the light diffuser according to the face information.

14. The flash lamp module according to claim 12, wherein the voltage-controlled light diffusing module based on the face information comprises:

a light diffuser, comprising a plurality of sub-blocks, the light diffuser respectively adjusts scattering energy or transmission energy of light passing the sub-blocks by applying different driving voltages;

a driving circuit for the light diffuser, coupled to the light diffuser, respectively providing the driving voltage for the sub-blocks of the light diffuser; and an information processing unit, coupled to the driving circuit for the light diffuser, receiving at least one message with the face information and respectively determining the driving voltage for each of the sub-blocks of the light diffuser according to the face information.

15. A method for controlling a flash lamp, applicable to control the flash lamp of a voltage-controlled light diffusing module based on a face information, the method comprising:

receiving a face information;

deciding a driving voltage of a driving circuit based on the face information;

adjusting light transmission of a light diffuser based on the driving voltage; and triggering a flash lamp unit to perform a flash procedure.

16. The method for controlling the flash lamp according to claim 15, further comprising:

determining whether a face is detected;

when the face is detected, determining the driving voltage based on the face information; and when the face is not detected, triggering the flash lamp unit to perform the flash procedure.

* * * * *